Feb. 25, 1958  A. R. COVIELLO  2,824,505
AGRICULTURAL IMPLEMENT AND SUPPORT VEHICLE THEREFOR
Filed Jan. 3, 1955  3 Sheets-Sheet 2
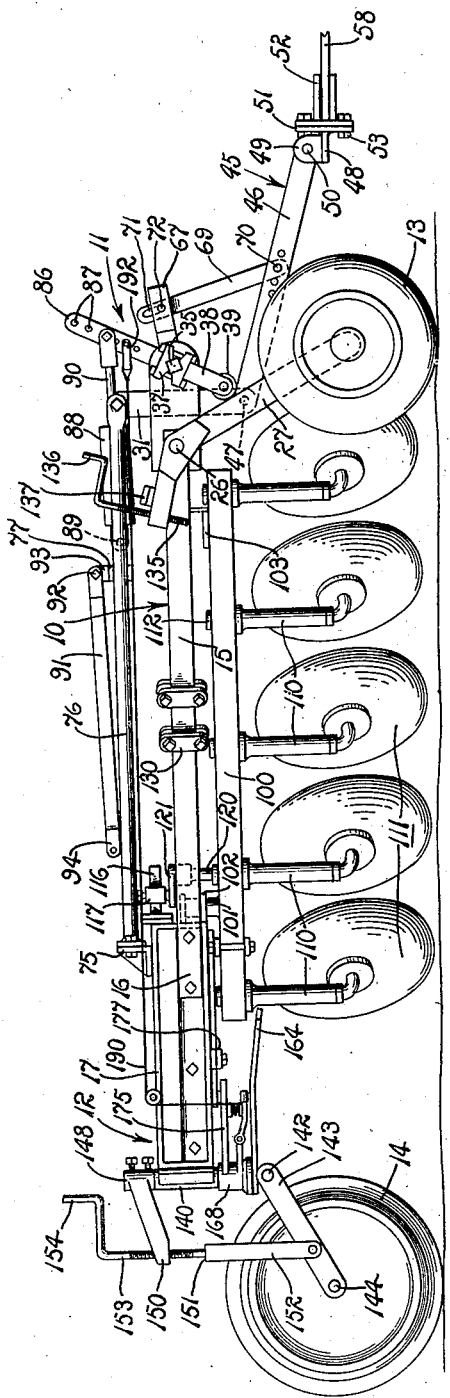
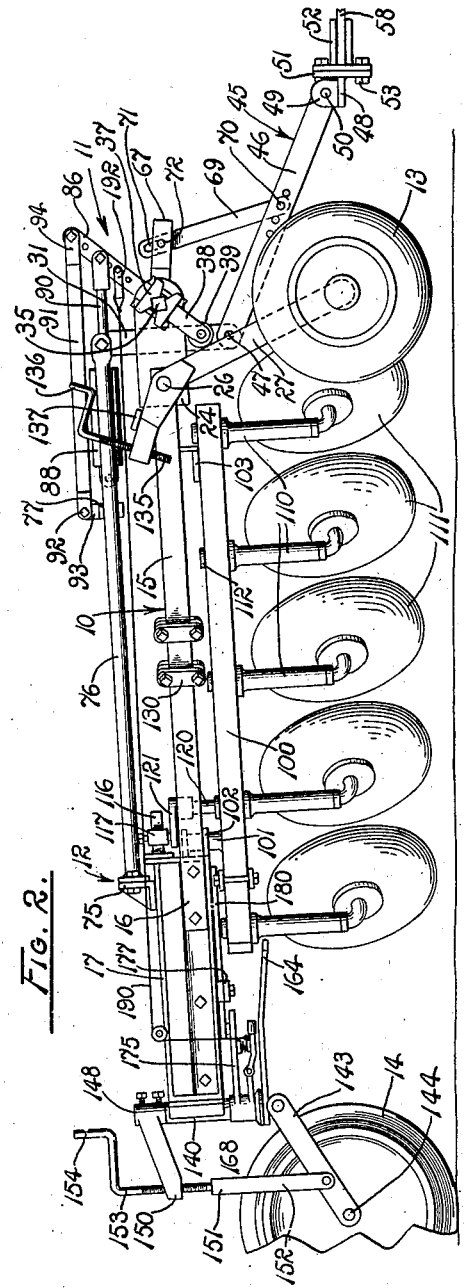
ANTHONY R. COVIELLO
INVENTOR
HUEBNER, BEEHLER,
WORREL & HERZIG
ATTORNEYS
BY
Richard M. Worrel

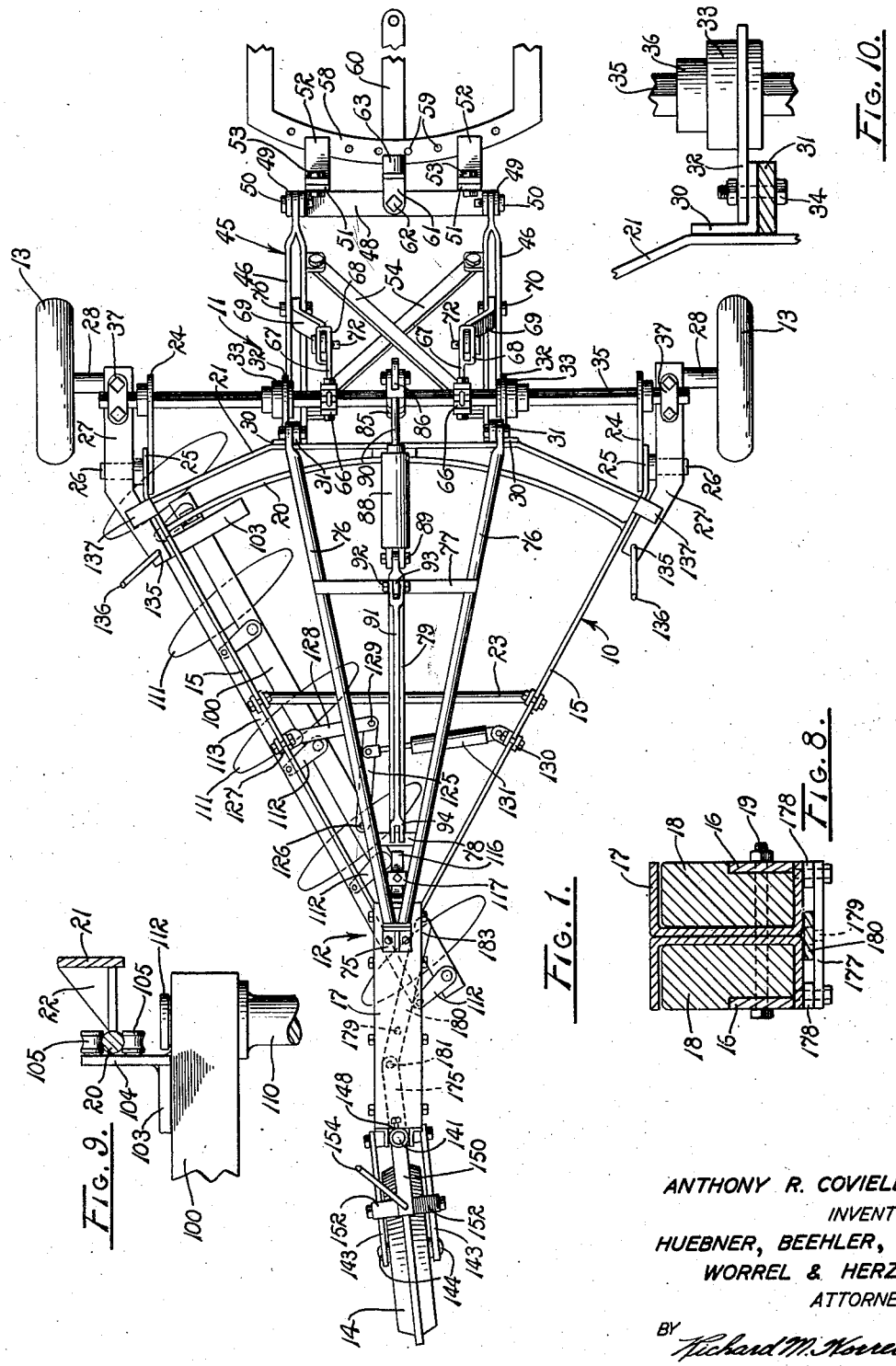

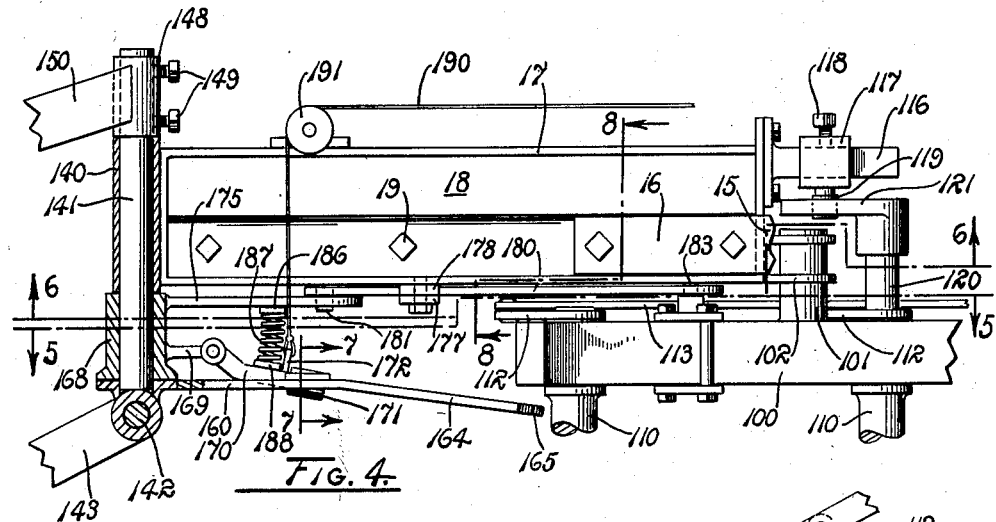
FIG. 4.
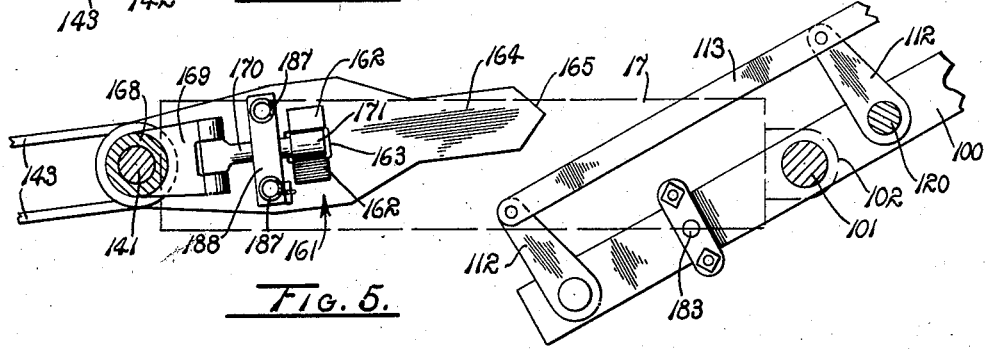
FIG. 5.
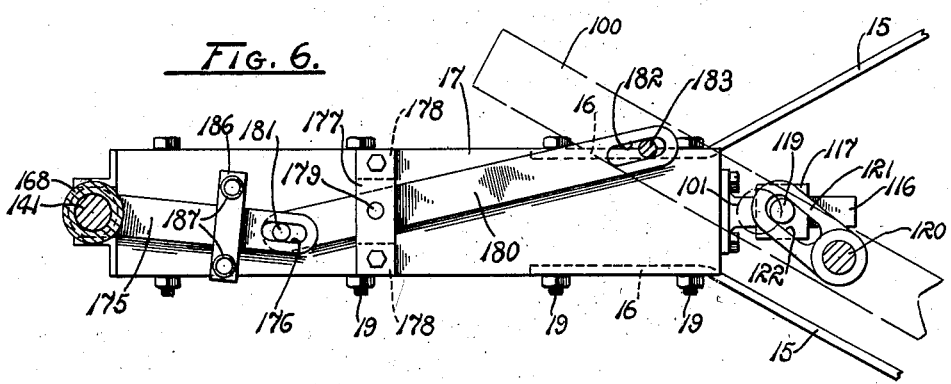
FIG. 6.
FIG. 7.
ANTHONY R. COVIELLO
INVENTOR
HUEBNER, BEEHLER,
WORREL & HERZIG
ATTORNEYS United States Patent Office 2,824,505
Patented Feb. 25, 1958

2,824,505

AGRICULTURAL IMPLEMENT AND SUPPORT VEHICLE THEREFOR

Anthony R. Coviello, Tulare, Calif.

Application January 3, 1955, Serial No. 479,611

8 Claims. (Cl. 97—32)

The present invention relates to agricultural implements and more particularly to an improved support vehicle or draft frame for earth working tools and the like.

The subject invention constitutes a companion implement to the reversible plow disclosed in my United States Patent No. 2,600,359 and is a continuation-in-part of my prior copending application, Serial Number 238,065, filed July 23, 1951, now Patent No. 2,732,781. As before, the present improvement is not limited to use with reversible plows or even agricultural implements but, in principle, possesses utility in support vehicles generally wherein similar problems are involved.

My above cited patent and application both relate to reversible plows in which disc plow blades are selectively positionable between opposite operational positions to work encountered earth laterally to either side of earth traversing travel while in earth engagement. In order to counteract the resulting side thrust, a rudder or tail guide wheel is employed in controlled interconnected relation to a plow mounting beam whereby the guide wheel is positioned in predetermined attitudes as the plow blades are reversed from one operating position to the other.

My copending application was designed to permit more convenient transportation of such reversible plow implements where their structures were of considerable size and weight as compared to similar light weight implements transportable on conventional tractor lift mechanisms.

Even with the significant improvements realized by the structure disclosed in my copending application, it was found that many farmers preferred to carry substantial portions of the weights of reversible plows on their tractors. Heretofore, such has been impossible in the larger and heavier implement sizes.

Thus, although my prior structure permitted elevational positioning of the implement frame on the support wheels and permitted swivelling of the rudder wheel, no provision was made for elevation of the front wheels into a tractor connected thereto. This made transportation of the implement, and specifically the turning of corners, difficult under certain circumstances. Sharp corners and turns, such as might be made by Caterpillar tractors frequently placed undue strain on the implement.

Maneuverability is desirable, of course, not only in transportation of the implement but also in negotiating sharp turns in back and forth plowing patterns during regular use of the implement. The improvements of the instant application, therefore, are of considerable significance and have been found, in practice, to improve the adaptability and usefulness of the implement.

Accordingly, it is an object of this invention to provide improvements in support vehicles for earth working tools.

Another object is to provide an improved support vehicle for agricultural implements and the like which automatically compensates for lateral thrust generated by earth working tools borne thereby in earth engagement or comparable thrust producing members and provides support for such earth working tools when elevated for transporting purposes devoid of any lateral thrust compensating effect.

Another object is to provide an improved support vehicle, having a pair of forward support wheels and a rear support wheel which is adapted for elevational adjustment between an upper position with the forward support wheels out of ground engagement and the rear support wheel released for free swivelling movement and a lowered position with the forward support wheels in ground engagement and the rear support wheel in controlled guiding position.

Another object is to provide an improved support vehicle for agricultural implements and the like adapted to enable the turning of exceedingly sharp corners.

Another object is to provide an improved support vehicle adapted for selective tractor support and suitable for even larger agricultural implements and the like than previously thought possible.

Another object is to provide a vehicle of the character described in the preceding paragraph which enables elevational and lateral control of the implements and which is highly maneuverable during normal use and during transportation thereof.

Other objects are to provide an improved support vehicle for earth working implements which is of durable construction, economical to manufacture and use, reliable and dependable in operation and fully effective for its intended purposes.

These and other objects will become more fully apparent upon reference to the following description.

In the drawings:

Fig. 1 is a plan view of a reversible plow embodying the principles of the present invention adjusted to discharge encountered earth laterally to the left of a line of draft.

Fig. 2 is a side elevation of the reversible plow of Fig. 1 illustrating the support vehicle and earth working implements in an intermediate elevational position with the forward wheels in ground engagement and the rear guide wheel released for free swiveling movement.

Fig. 3 is a view similar to Fig. 2 but showing the support vehicle and earth working implements in their upper elevational position with the forward end portion of the draft frame including the forward support wheels out of ground engagement and supported on the prime mover and rear guide wheel, the latter being released for free swiveling movement.

Fig. 4 is a somewhat enlarged fragmentary side elevation of the rear end portion of the draft frame partially in cross section and showing the position of a detent mechanism when the supported vehicle is in its lowermost elevational position.

Fig. 5 is a horizontal section taken on line 5—5 of Fig. 4.

Fig. 6 is a horizontal section taken on line 6—6 of Fig. 4.

Fig. 7 is a somewhat enlarged vertical section taken on line 7—7 of Fig. 4.

Fig. 8 is a somewhat enlarged vertical section taken on line 8—8 of Fig. 4.

Fig. 9 is a somewhat enlarged fragmentary section through the center of the forward end portion of the support vehicle with the plow beam centrally positioned.

Fig. 10 is a somewhat enlarged fragmentary detail view of a part of the forward end portion of the draft frame showing the mounting of a rock shaft on the frame.

Referring in greater detail to the drawings:

A draft frame is indicated generally at 10 having a forward end portion 11 and a rearward end portion 12. The forward end portion is mounted in elevationally adjustable relation on a pair of laterally spaced support wheels 13. The rearward end portion of the frame is mounted in adjusted elevational relation on a combined guide and swivel wheel 14.

The draft frame 10 conveniently comprises a pair of forwardly divergent bars 15 having spaced rearward end portions 16. A tail wheel bracket 17, conveniently shown as back to back channels or an I-beam, is mounted between the rearward end portions of the bars. Ballast or weight members 18 are mounted on each side of the I-beam and a plurality of bolts 19 are extending through the rearward end portions, ballasts and I-beam so as to connect these members rigidly together.

The forward ends of the bars 15 are interconnected by an arcuate track 20 having a substantially cylindrical cross section, evident in Fig. 8, concentric to a point midway between the rearward end portions of the bars 15. An angulated member 21 also interconnects the forward end portions of the bars 15 forwardly of the track 20 and equidistantly spaced from a point midway between the rear ends of the bars 15. The track and angulated member are disposed in a substantially horizontal plane and are interconnected by a web 22. A transverse strut 23 is connected between the bars 15 intermediate their forward and rearward ends for imparting additional rigidity thereto.

A pair of laterally spaced inner brackets 24 are rigidly mounted on forward end portions 25 of the bars 15 and extend forwardly therefrom in parallel, substantially equally spaced relation to an imaginary line symmetrically located relative to the angulated member 21 and radial to the track 20 in equidistant relation from the bars 15. Pivot bolts 26 are extended laterally from the forward end portions 25 of the bars 15. A leg 27 is pivotally mounted on each of the bolts 26 and provides an end downwardly and forwardly extended therefrom and an opposite end rearwardly and upwardly extended therefrom to a position above the bars 15. The support wheels 13 are individually rotatably mounted on pivot axles 28 journaled in the forwardly extended ends of the legs 27.

Referring in particular to Fig. 10, pairs of spaced angle brackets 30 are weldably or otherwise secured on the central portion of the angulated member 21 and extend forwardly therefrom in substantially parallel spaced relation. Mounting posts 31 are provided between each pair of angle brackets in substantially erect positions and provide upwardly extended ends above the brackets and downwardly extended ends below the brackets, as best seen in Figs. 2 and 3. Journal plates 32 are located adjacent to each pair of brackets 30 and extend forwardly therefrom in spaced parallel relation. Journal sleeves 33 are provided in each of the journal plates and are in substantially horizontally aligned relation. Bolts 34 are extended through the respective journal plates, spaced angular brackets and mounting posts for connecting these members rigidly together.

A rock shaft 35 having a substantially square cross section is journaled in the journal sleeves 33 of the journal plates 32 on suitable bearing sleeves 36 and extends transversely of the frame 10. Obviously, the shaft could be any non-circular, polygonal shape. Clamp blocks 37 are provided on the opposite ends of the rock shaft and mount control arms 38 in rigid radially extended relation from the rock shaft forwardly above the legs 27. Rollers 39 are provided on the outer ends of the control arms and are adapted for rotatable engagement with the upper surface of the leg adjacent thereto.

A draft mechanism, generally indicated at 45, is provided on the forward end portion 11 of the draft frame 10 and includes a pair of laterally spaced forwardly extended lift or draft bars 46 pivotally connected by pivot pins 47 to the downwardly extended ends of the mounting posts 31. A forward crossbar 48 providing clevises 49 at the opposite ends thereof is pivotally connected by pins 50 to the forward ends of the lift bars. A pair of connecting plates 51 are rigidly attached in substantially forwardly facing perpendicular relation to the forward crossbar 48. Bifurcated lugs 52 are secured as by bolts 53 to the connecting plates 51. Crossbars 54 are connected between the lift bars for imparting rigidity thereto.

A draft vehicle, not shown, includes a rearwardly extended arcuate segment bar 58 having apertures 59 spaced along the rearward section thereof. A draft tongue 60, adapted at the forward end thereof for pivotal connection to the draft vehicle, not shown, also includes a clevis 61 at the rear end thereof for attachment to the crossbar 48 of the draft mechanism 45 by a bolt 62. In addition, a roller 63 is mounted on the draft tongue and is extended upwardly in overlying rolling engagement with the rearward section of the segment bar.

A pair of spaced clamp blocks 66 are attached to the rock shaft 35 intermediate the journal plates 32 and lift arms 67 are secured rigidly to the clamp blocks being extended radially therefrom and in substantially right angular relation to the control arms 38. Each lift arm provides an elongated eyelet piece 68 mounted on its outer end. Connecting links 69 are pivotally connected by pivot pins 70 at their lower ends to the lift arms intermediate the forward and rearward end portion thereof. The connecting links also include slots 71 in their upper ends which are extended into the eyelet pieces of the lift arms and connected thereto by pivot pins 72.

A rear bracket 75 is rigidly secured on the upper surface of the tail wheel bracket 17. A pair of longitudinal braces 76 of tubular shape are connected rearwardly to the rear bracket 75 and are forwardly extended in divergent relation being connected at their forward ends to the upwardly extended ends of the mounting posts 31. Forward and rearward crosspieces 77 and 78, respectively, are connected transversely between the longitudinal braces. Further, a longitudinal central piece 79 is connected medially between the forward and rearward crosspiece all of which add rigidity to the framework.

A further clamp block 85 is attached to the rock shaft centrally of the lift arms 67. A control lever 86 is integrally connected to the clamp block 85 and extends radially therefrom displaced substantially 180° from the control arms 38 for controlled positioning of the rock shaft and thus the control arms. The control lever provides a plurality of longitudinally spaced apertures 87 therein. A two-way hydraulic ram 88 is pivotally mounted rearwardly at 89 to the forward crosspiece 77 and provides a piston rod 90 pivotally connected to the outwardly extended end of the control lever 86. A lock bar 91 is rearwardly pivoted at 92 on a bracket 93 upwardly extended from the forward crosspiece 77. The lock bar provides a connecting clevis 94 on the end thereof opposite to the pivotal connection and adapted for releasable connection to the upwardly extended end of the control lever 86 in one of the apertures 87.

A beam 100 of box steel or other suitable material is pivotally mounted in the frame 10 by a pin 101 vertically journaled in a bearing 102 forwardly extended from the tail wheel bracket 17. The beam is oppositely horizontally extended from its pivotal mounting and provides a transversely extended substantially horizontal stop bracket 103 at its forward end adjacent to the arcuate track 20. A further transverse plate 104 is weldably or otherwise attached in substantially erect position along the forward edge of the stop bracket rearwardly adjacent to the arcuate track. A pair of rollers 105 are rotatably mounted on the transverse plate on horizontal axes and forwardly extended therefrom in rolling engagement with the track 20 above and below thereof, as shown in Fig. 9. It should be noted that the beam is disposed in vertically spaced relation to the bars 15 so that during pivoting movement of the beam the stop bracket is permitted to move beneath the bars 15 in the outward limiting positions of the beam.

A plurality of tool posts 110 are rotatably mounted in the beam 100 in substantially equally spaced relation and downwardly extended therefrom. A plow disc blade 111 is rotatably mounted on the lower end of each post in earth engaging attitude. Plow control arms 112 are radially extended from the tool posts above the beam 100 and a rigid push-pull bar 113 is pivotally connected between the radially extended ends of the control arms. The mounting of the arms and connection to the push-pull bar are such that the tool posts and their disc blades are constrained to substantially uniform rotational positioning in the beam.

Referring to Fig. 4, a mounting stud 116 of substantially square cross section is connected to the tail wheel bracket 17 and forwardly extended therefrom. A slide block 117 is slidably non-rotatably fitted on the mounting stub and a set screw 118 is provided for fixing the position of the block on the stub. A roller 119, constituting a cam follower, is rotatably mounted in dependent position on the slide block for movement therewith longitudinally of the stub. One of the tool posts 110 rearwardly in the beam 100 is provided with an upper extension 120. A plow positioning arm 121 having a longitudinal slot 122 therein is rigidly rearwardly extended radially from the upper extension 120 to a position immediately below the slide block 117 whereby the cam follower 119 is rotatably received in sliding relation in the longitudinal slot 122. It will be seen that as the beam 100 is pivoted from one side of the frame 10 to the other with the forward end portion supported on the track 20, the operation of the cam follower in the slot will automatically reverse the positions of the plow blades 111 so that they discharge encountered earth laterally in a direction opposite to that previously effected. The extent of the pivotally positioning of the plow blades in the beam is adjustable by slidable movement of the block 117 on the mounting stub 116 thereby to vary the relative position of the cam follower in the slot 122.

It will be apparent that, when desired, mechanical, hydraulic, pneumatic or manual systems may be employed to position pivotally the beam 100 in the frame 10. A suitable system is that shown in my prior co-pending application Serial No. 238,065, filed July 23, 1951. As provided by the present embodiment, however, a beam positioning lever 125 is pivotally connected by a pin 126 upwardly on the beam 100. A bracket 127 attached to one of the bars 15 mounts a link 128 rigidly extended inwardly of the bar. The inner end of the link 128 is pivotally connected at 129 to the beam positioning lever 125 at the end thereof opposite its pivotal connection to the beam. A further bracket 130 is attached to the other bar 15 substantially opposite to the bracket 127. A two-way hydraulic ram 131 is pivotally connected at one end to the bracket 130 and at its opposite end intermediate the ends of the beam positioning lever adjacent to the pivotal connection 129.

Hydraulic fluid under pressure is directed selectively to opposite ends of the ram 131 to pivot the beam 100 in the frame by swinging the beam positioning lever on its pivot pins 126 and 129 as will be readily apparent. When the ram 131 is extended, the beam 100 is pivoted in a counterclockwise direction, as viewed in Fig. 1, to move the forward end portion of the beam to the left in the frame relative to the forward direction of movement. When the ram is contracted, the beam is moved at a clockwise direction to a position opposite from that shown in Fig. 1 adjacent to the opposite bar 15.

At opposite limits of its pivotal movement, the forward end portion of the beam 100 is adjacent to and below the rearwardly extended ends of the legs 27. A stop bolt 135 is screw-threadably mounted in the rearward end portion of each of the legs and downwardly extended therefrom for engagement with the stop bracket 103 extended outwardly under the respective bar 15 when the beam is positioned adjacent thereto. That is, whenever the beam is in operable position, the forward end portion thereof is so positioned that one of the stop bolts will strike the stop bracket and by such engagement limit upward pivotal movement of its respective leg and thus automatically limit the depth of descent of the side of the forward end portion of the frame on which the leg is mounted. It will be apparent, that the opposite leg is not limited by the engagement of its stop bolt with the stop bracket and thus exercises no appreciable supporting effect on the frame. A crank handle 136 is provided on each of the stop bolts for enabling adjustment thereof in order to control the desired depth of earth engagement of the disc blades.

Further, a limit plate 137 is extended outwardly from each bar 15 adjacent to the forward end thereof in upwardly disposed position to the respective leg. The limit plates are for the purpose of limiting the upward pivotal movement of the rearwardly extended portion of the leg when the wheel 13 on that particular side is spaced a considerable distance from the ground. Thus, the limit plate prevents the wheel from pivoting back underneath the draft frame 10.

Considering the rearward end portion 12 of the draft frame 10, a sleeve 140 is weldably or otherwise connected in substantially vertical position to the rearwardly extended end of the tail wheel bracket 17. An elongated shaft 141 is rotatably mounted in the sleeve and provides upwardly and downwardly extended ends. A pin 142 is attached perpendicularly at the lower end of the shaft 141 for rotatable movement therewith. A rearwardly extended yoke 143 is pivotally connected to the transverse pin 142. An axle 144 journaled in the rearwardly extended end of the yoke rotatably mounts the guidable swivel wheel 14.

A collar 148 is fitted on the upwardly extended end of the shaft 141 and is adjustable thereon by means of set screws 149. A guide arm or bracket 150 is integrally connected to the collar 148 and rearwardly extended downwardly therefrom. A vertically positioned yoke 151 providing downwardly dependent legs 152 pivotally connected to the yoke 143 is extended upwardly in arched relation to the swivel wheel. A threaded bolt 153 providing a control handle 154 is attached at its lower end to the vertical yoke and screw-threadably received through the rearwardly extended end of the guide arm 150.

A forwardly extended latch plate 160 is weldably or otherwise attached at its rear end to the lower end of the shaft 141 above the pin 142 for rotatable movement with the shaft. The latch plate provides a detent receptacle 161 therein having lateral upwardly inclined ramps 162 and a central detent slot 163. Further, the latch plate provides a downwardly angulated, forwardly extended swivel wheel positioning arm 164 having a forward pointed end 165.

A bearing 168 is journaled on the downwardly extended end of the shaft 141 between the latch plate 160 and the sleeve 140. A detent mounting arm 169 is connected to the bearing 168 and forwardly extended therefrom, as seen in Fig. 4. A detent holder 170 is pivotally connected to the detent mounting arm and provides a detent roller 171 adapted to fit easily in the detent receptacle 163 of the latch plate 160.

A guide lever 175 is rearwardly attached to the bearing 168 and is forwardly extended therefrom providing a slot 176 in its forward end. A strap 177 is connected beneath the tail wheel bracket 17 and is positioned in spaced relation thereto by spacer blocks 178 mounted between the strap and the bracket 17. A vertically disposed pivot pin 179 is extended centrally through the strap into the tail wheel bracket. An elongated fulcrum bar 180 is pivotally mounted intermediate its ends on the pivot pin 179 and provides a pin 181 on one of its ends slidably fitted in the slot 176 of the guide lever. The fulcrum bar also provides a slot 182 on the end thereof opposite from the pin 181. A pin 183 is extended upwardly from the beam 100 rearwardly adjacent to the pivot pin 101 which connects the beam to the tail wheel bracket and the pin 183 is slidably received in the slot 182 in the fulcrum bar.

An upper mounting plate 186 is weldably or otherwise secured beneath the guide lever 175 and provides a pair of springs 187 connected at the outer ends thereof and dependent therefrom. A lower spring plate 188 is connected to the other ends of the springs and is secured, as by welding, to the detent holder 170 rearwardly adjacent to the detent roller 171 for releasably urging the roller 171 into the slot 163 of the detent receptacle 161. An eyelet block 172 is connected to the lower spring plate and extends upwardly therefrom.

An elongated cord 190 is connected at one end thereof to the eyelet 189 and is threaded around a pulley 191 mounted on the tail wheel bracket 17 for extension forwardly of the draft frame 10. The cord provides a hook 192 on its forward end for releasable engagement in one of the apertures 87 of the control lever 86.

Operation

The operation of this invention is believed to be readily apparent and is briefly summarized at this point.

Considering the plow as shown in Figs. 1 and 2, the apparatus of this invention is placed in condition for normal plowing operation by extending or retracting the ram 131 to position the beam 100 in the desired position and by retracting the hydraulic ram 88 thereby to pivot the rock shaft 35 in a counterclockwise direction, as viewed in Fig. 2. This enables the legs 27 to pivot in a counterclockwise direction on the pivot bolts 26 under the weight of the plow. The plow blades are rotated on their tool posts by plow positioning arm 121 rotating the upper extension 120 of one of the tool posts which movement is transmitted to the other blade posts by the push-pull bar 113.

Retracting the ram 88 thus has the effect of lowering the draft frame 10 thereby lowering the earth working blades 111 into earth engagement, a position not fully shown in the drawings, although partially seen in Fig. 4. Retraction of the ram also releases tension on the control cord 190 thereby to lower the detent holder 170 under urgence of the springs 187. Referring to Figs. 4 and 5, and assuming that when the detent holder is lowered through a release of tension on the cord, the slot 163 of the detent receptacle is in vertical alignment with the detent roller 171, the roller will drop into the slot as seen in Figs. 4, 5, and 7. When the plow is adjusted in this manner, it is ready for normal plowing operation by imparting forward movement to the plow through a prime mover, not shown, attached to the segment bar 58 and draft tongue 60.

Assuming, however, that when the tension on cord 190 is released the detent roller 171 is misaligned from the slot 163 in the detent receptacle, engagement occurs somewhat differently. Thus, as the plow is driven forwardly, the swivel wheel 14 tends to align itself with the forward direction of movement and normal vibration caused by earth engagement around this forward direction of movement brings the slot 163 into alignment with the detent roller, the latter being fixed by the position of the plow beam 100. As in my prior co-pending application Serial No. 238,065, cited above, the guide wheel 14 resists side draft incident to the plow operation. The limit plates 137 prevent the wheels 13 from folding back underneath the frame when traveling above the ground.

When it is desired to negotiate a turn after plowing the length of a row, the plow beam 100 initially is elevated by extending the hydraulic ram 88. In this instance the ram is extended even farther than the position shown in Fig. 2. Thus, referring to Fig. 3, the ram pivots the rock shaft 35 in a clockwise direction to apply downward pressure on the forwardly extended portions of the legs 27 through the rollers 39 on the control arms 38. This pivots the legs in a clockwise direction around the bolts 26 until the upwardly extended ends of the legs abut against the limit plates 137. This lifts the plow blades 111 out of the ground into the position of Fig. 2.

Further extension of the ram lifts the forward end portion 11 of the draft frame 10 on the segment bar 58 attached to the prime mover, not shown. This is accomplished through the lift arms 67 and links 69 connected between the rock shaft 35 and drawbars 46. As the rock shaft rotates it applies a clockwise torque to the mounting post 31. Since the lift arms and connecting links are resisted in downward movement by the drawbars, the mounting posts are forced upwardly. Thus, the draft frame 10, which is connected to the mounting posts, is forced upwardly. Fig. 3 shows this position of the apparatus.

During the extension of ram 88, the cord 190 is also extended or placed under tension thereby to lift the detent roller 171 out of the slot 163 in the detent receptacle 161. This frees the swivel wheel 14 for freely swiveling movement on shaft 141 relative to the draft frame 10. With the plow in this condition, and referring to Fig. 1, it is assumed that a right hand turn is to be executed, that is, a turn in a clockwise direction when viewing Fig. 1 from above and facing in the forward direction of movement.

The hydraulic ram 131 is first retracted to pivot the plow beam 100 from its left hand position in the draft frame 10 to its limiting position at the right side of the frame. This pivoting movement of the plow beam also pivots the fulcrum bar 180 around pin 179. The fulcrum bar, in turn, pivots the guide lever 175 which is rigidly connected to the bar 168. This, of course, also pivots the detent mounting arm 169 from its position in Fig. 5 to a position angularly displaced therefrom and slightly to the right from the position shown in Fig. 5. It is to be understood that since the detent roller is not in engagement with slot 163, the swivel wheel 14 is not moved by movement of the plow beam. Instead, when the plow beam moves from left to right as above described, the rearwardmost tool post 110 abuts against the pointed end 165 of the swivel wheel positioning arm 164. Inasmuch as the arm 164 is rigidly connected to the guide wheel 14, the latter is angled in a counterclockwise direction to an even greater extent than shown in Fig. 1 or 5. It is to be noted, however, that the rearwardmost tool post slips past the pointed end 165 in the right limiting position of the plow beam so that the swivel wheel positioning arm is able to return toward a central position if sufficient force is applied thereto.

When the plow is positioned in this manner, a right hand turn may be easily executed. Several things are to be noted about the plow in this position which enable the execution of a very sharp turn previously impossible with implements of the size, shape and weight under consideration. Thus, the plow may be turned on the guide wheel 14 alone since the forward end portion 11 of the frame, including the forward support wheels 13, is completely out of ground engagement. In addition, the guide wheel is released for freely swiveling movement and has been pre-conditioned by the plow beam 100, prior to turning, in a more favorable attitude for executing a sharp right hand turn.

After the turn has been made and the plow is in position for traveling down the field in the opposite direction, it is necessary to lower the draft frame 10. Thus, the ram 88 is retracted and the blades 111 lowered into earth engagement in a manner now believed quite apparent. Since the plow beam 100 has already been swung to the right hand side, the plow blades 11 are disposed for engaging encountered earth in the same direction as when plowing in the previous row. However, the guide wheel must be fixed to resist the side draft of the blades 111. As above explained, the detent roller is lowered when the ram 88 is retracted and if the roller and slot 163 are not initially in alignment, forward movement of the plow and normal vibration of the wheel will readily bring the slot 163 under the roller so that the latter will fall into engagement in the slot. Once the detent roller falls in the slot, it will not slip out since the axial line of the roller lies below the upper edges of the slot. This, of course, is a significant features of the ramps 162.

Although the above operation has related to plow operations, probably the more important and frequent use of the principles of this invention will be encountered when transporting the device and in negotiating turns. The adjustment of the plow for such transportation is identical to that described above in relation to execution of a turn during plowing. It will be understood that it is highly advantageous during transportation of such a large implement to be able to draw it only on the rear guide wheel 14 and to permit freely swiveling movement of such wheel. This, of course, is precisely what is accomplished when ram 88 is extended in the manner above described. In either case, the arm 91 is available for connection to the arm 37 to lock the frame and wheels 13 in upper position.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An agricultural implement comprising a frame having forward and rearward end portions, earth working tools, means including tool posts individually connected to the earth working tools and mounting the tools in the frame for reversible movement therein between opposite operational positions, a draft connection mounted on the forward end portion of the frame adapted for connection to a draft appliance and permitting elevational movement of the frame relative to such appliance, a pair of ground engaging support members means mounting the forward end portion of the frame in adjustable elevational position on the support members, a shaft rotatably mounted in substantially erect position on the rearward end portion of the frame, yoke means mounted on the shaft, a ground engaging guide rotatably mounted in the yoke means, a bearing rotatably mounted on the shaft, means interconnecting the bearing and the earth working tool mounting means rotatably positioning the bearing in predetermined attitudes on the shaft relative to the position of the earth working tool mounting means in said operational positions, a latch plate forwardly extended in fixed position relative to the shaft providing a detent receptacle therein, the latch plate having a forwardly extended guide positioning arm integral therewith and adapted to abut with one of the tool posts during movement of the earth working tool mounting means between said operational positions thereby to shift the guide into predetermined attitudes, a detent mounted on the bearing releasably engageable with the receptacle in the plate, and means for pivotally elevating the forward end portion of the frame on the draft appliance and guide simultaneously operable to release the detent from the receptacle to permit rotatable movement of the guide relative to the earth working tool mounting means.

2. An agricultural implement comprising a frame having forward and rearward end portions, earth working tools, means mounting the earth working tools in the frame for reversible movement therein between opposite operational positions, a draft connection mounted on the forward end portion of the frame adapted for connection to a draft appliance and permitting elevational movement of the frame relative to such appliance, a pair of support wheels, means mounting the forward end portion of the frame in adjustable elevational position on the support wheels, a shaft rotatably mounted in a substantially erect position on the rearward end portion of the frame, yoke means mounted on the shaft, a guide wheel rotatably mounted in the yoke means adapted for ground engagement, a bearing rotatably mounted on the shaft, means interconnecting the bearing and the earth working tool mounting means rotatably positioning the bearing in predetermined attitudes on the shaft relative to the position of the earth working tool mounting means in said operational positions, a latch plate forwardly extended in fixed relation from the shaft in substantially horizontal position having a detent slot therein and a pair of lateral inclined ramps on opposite sides of the slot, a detent holder mounted on the bearing for pivotal movement on a substantially horizontal axis, a detent roller rotatably mounted on the detent holder releasably engageable with the slot in the latch plate and having an axis of rotation lying below the edges of the ramps adjacent to the slot, spring means yieldably urging the detent roller into engagement with the slot, means for elevating the forward end portion of the frame on the draft appliance and guide wheel, and means connected between the elevating means and the detent holder for releasing the detent roller from slot incident to elevational movement of the forward end portion of the frame to permit free rotatable movement of the guide wheel relative to the earth working tool mounting means.

3. An agricultural implement comprising a frame having forward and rearward end portions, earth working tools, means mounting the earth working tools in the frame for reversible movement therein between opposite operational positions, a draft connection mounted on the forward end portion of the frame adapted for connection to a draft appliance and permitting elevational movement of the frame relative to such appliance, a pair of ground engaging support members, an elongated rock shaft rotatably mounted in the frame, means on the rock shaft for elevationally adjusting the forward end portion of the frame on the support members incident to rotation of the rock shaft, a control lever transversely extended from the rock shaft, a shaft rotatably mounted in a substantially erect position on a rearward end portion of the frame, yoke means mounted on the shaft, a guide rotatably mounted in the yoke means adapted for ground engagement, a bearing rotatably mounted on the shaft, means interconnecting the bearing and the earth working tool mounting means rotatably positioning the bearing on the shaft in response to movement of the earth working tool mounting means between said operational positions, a plate having a detent receptacle therein fixedly mounted on the shaft, a detent movably mounted on the bearing for movement toward and from the plate and being releasably engageable with the receptacle in the plate, a control member having an end portion connected to the detent and an opposite end portion connected to the control lever adapted to release the detent from the detent receptacle and to permit engagement of the detent in the receptacle incident to movement of the rock shaft, and means for rotating the rock shaft.

4. A reversible plow comprising a frame having forward and rearward end portions, a beam mounted in the frame for horizontal pivotal movement between opposite operational positions in the frame, earth working tools borne by the beam having a thrust laterally of the frame when engaged with the earth when the beam is in one operational position and an opposite direction of lateral thrust when the beam is in its opposite operational position, ground engaging support wheels, legs pivotally mounted on the frame having downwardly directed forward ends pivotally connected to the support wheels and upwardly directly rearward ends, an elongated rock shaft rotatably journaled in the frame, control arms fixedly connected to the rock shaft and radially extended therefrom, roller wheels rotatably connected to the control arms adapted to bear against the downwardly extended forward ends of the legs, a control lever fixedly connected to the rock shaft and radially extended therefrom in substantially perpendicular relation to the control arms, an hydraulic ram pivotally mounted in the frame and being pivotally connected to the control lever adapted upon extension and retraction to rotate the rock shaft for adjustable elevational movement of the forward end portion of the frame on the support wheels, an elevationally fixed draft means, means coupling the draft means to the frame, means interconnecting the rock shaft and the coupling means for elevating the forward end portion of the frame and the support wheels relative to the draft means upon rotation of the rock shaft, a shaft rotatably mounted in substantially erect position on the rearward end portion of the frame, yoke means mounted on the shaft, a guide wheel rotatably mounted in the yoke means adapted for ground engagement, a bearing rotatably mounted on the shaft, means interconnecting the bearing and the beam for rotatably positioning the bearing in pre-determined attitudes on the shaft in response to movement of the beam between said operational positions, a latch plate having a detent receptacle therein fixedly mounted on the shaft, a detent holder mounted on the bearing for vertical pivotal movement and having a detent roller on the outer end thereof releasably engageable with the detent receptacle, spring means yieldably urging the detent roller into engagement with the detent receptacle, and flexible means connecting the detent holder to the control lever adapted to raise and lower the detent holder in response to rotation of the rock shaft.

5. An agricultural implement comprising a frame having forward and rearward end portions, a pair of legs pivotally connected to the frame having downwardly extended forward end portions and upwardly extended rearward end portions, ground engaging support wheels rotatably mounted on the forward end portions of the legs, means limiting the upward pivotal movement of the rearward end portions of the legs, a horizontal rock shaft rotatably mounted in the frame, control arms connected to the shaft radially extended therefrom and having rollers thereon adapted to abut the forward end portions of the legs for depressing the legs relative to the frame, a pair of mounting posts vertically positioned at the forward end portion of the frame having downwardly extended ends, an elevationally fixed draft means, a draft mechanism rearwardly pivotally connected to the downwardly extended ends of the mounting posts and forwardly extended therefrom, means pivotally connecting the forwardly extended portion of the draft mechanism to the elevationally fixed draft means, a pair of lift arms connected to the rock shaft and radially extended therefrom substantially perpendicularly relative to the control arms, links pivotally connected at their opposite ends to the lift arms and to the draft mechanism, and means for rotating the rock shaft.

6. An agricultural implement comprising a frame having forward and rearward end portions, a pair of legs pivotally connected to the frame having downwardly extended forward end portions and upwardly extended rearward end portions, ground engaging support wheels rotatably mounted on the forward end portions of the legs, means limiting the upward pivotal movement of the rearward end portions of the legs, a horizontal rock shaft rotatably mounted in the frame, control arms connected to the shaft radially extended therefrom and having rollers thereon adapted to abut the forward end portions of the legs for depressing the legs relative to the frame, a pair of mounting posts vertically positioned at the forward end portion of the frame having downwardly extended ends, an elevationally fixed draft means, draft arms rearwardly pivotally connected to the downwardly extended ends of the mounting posts and forwardly extended therefrom, means pivotally connecting the forwardly extended portion of the draft arms to the elevationally fixed draft means, a pair of lift arms connected to the rock shaft and radially extended therefrom substantially perpendicularly relative to the control arms, links pivotally connected at their opposite ends to the lift arms and to the draft arms, a ground engaging guide wheel, means mounting the rearward end of the frame on the guide wheel for free swiveling movement, means for releasably locking the guide wheel in predetermined attitudes, means for rotating the rock shaft, and means interconnecting the rotating means and the locking means for releasing the lock means during elevational positioning of the forward end portion of the draft frame to permit freely swiveling movement of the guide wheel.

7. An agricultural implement comprising a frame having opposite end portions; a pair of legs pivotally connected to the frame having upwardly and downwardly extended end portions; ground engaging support means mounted on the downwardly extended end portions of the legs; means limiting the upward pivotal movement of the upper end portions of the legs; a substantially horizontal rock shaft rotatably mounted in the frame; control arms connected to the shaft, transversely extended therefrom, and adapted to engage the downwardly extended portions of the legs for depressing the legs relative to the frame; a substantially erect mounting post connected to one of the end portions of the frame and having a downwardly extended end; an elevationally fixed draft means; a draft mechanism having an end pivotally connected to the downwardly extended end of the mounting post and an oppositely extended end pivotally connected to the draft means; a lift arm connected to the rock shaft and transversely extended therefrom in angular relation to the control arms; a link pivotally interconnecting the lift arm and the draft mechanism; and means for rotating the rock shaft.

8. An agricultural implement comprising a frame having forward and rearward end portions, earth working tools, means mounting the earth working tools in the frame for reversible movement therein between opposite operational positions, a draft connection mounted on the forward end portion of the frame adapted for connection to a draft appliance and permitting elevational movement of the frame relative to such appliance, a shaft rotatably mounted in a substantially erect position on the rearward end portion of the frame, yoke means mounted on the shaft, a guide wheel rotatably mounted in the yoke means adapted for ground engagement, a bearing rotatably mounted on the shaft, means interconnecting the bearing and the earth working tool mounting means rotatably positioning the bearing in predetermined attitudes on the shaft relative to the position of the earth working tool mounting means in said operational positions, a latch plate forwardly extended in fixed relation from the shaft in substantially horizontal position having a detent slot therein, a detent holder mounted on the bearing for pivotal movement on a substantially horizontal axis, a detent mounted on the detent holder releasably engageable with the slot in the latch plate, spring means yieldably urging the detent roller into engagement with the slot, means for elevating the forward end portion of the frame on the draft appliance, and means connected between the elevating means and the detent holder for releasing detent from slot incident to elevational movement of the forward end portion of the frame to permit free rotatable movement of the guide wheel relative to the earth working tool mounting means.

References Cited in the file of this patent

UNITED STATES PATENTS

| | | |
|---|---|---|
| 1,529,042 | Teasley et al. | Mar. 10, 1925 |
| 2,084,629 | Coviello | June 22, 1937 |
| 2,490,656 | Seaholm et al. | Dec. 6, 1949 |
| 2,569,201 | Smith | Sept. 25, 1951 |
| 2,717,479 | Scheidenhelm et al. | Sept. 13, 1955 |